US011668357B2

(12) United States Patent
Palermo et al.

(10) Patent No.: US 11,668,357 B2
(45) Date of Patent: Jun. 6, 2023

(54) BRAKE FOR TRANSMISSION LINE OF AIRCRAFT CONTROL SURFACES

(71) Applicant: Airbus Canada Managing GP Inc., Quebec (CA)

(72) Inventors: Michael Palermo, Quebec (CA); Pier Alexandre Guimond, Quebec (CA)

(73) Assignee: AIRBUS CANADA MANAGING GP INC., Quebec (CA)

( * ) Notice: Subject to any disclaimer, the term of this patent is extended or adjusted under 35 U.S.C. 154(b) by 433 days.

(21) Appl. No.: 16/767,971

(22) PCT Filed: Nov. 27, 2018

(86) PCT No.: PCT/IB2018/059361
§ 371 (c)(1),
(2) Date: May 28, 2020

(87) PCT Pub. No.: WO2019/106539
PCT Pub. Date: Jun. 6, 2019

(65) Prior Publication Data
US 2021/0190154 A1     Jun. 24, 2021

Related U.S. Application Data

(60) Provisional application No. 62/592,674, filed on Nov. 30, 2017.

(51) Int. Cl.
*F16D 49/16*      (2006.01)
*B64F 5/40*       (2017.01)
(Continued)

(52) U.S. Cl.
CPC .............. *F16D 49/16* (2013.01); *B64C 13/28* (2013.01); *B64F 5/40* (2017.01); *F16D 2121/14* (2013.01); *F16D 2125/40* (2013.01)

(58) Field of Classification Search
CPC ................. F16D 2121/14; F16D 55/22; F16D 2065/1368; F16D 2065/1392;
(Continued)

(56) References Cited

U.S. PATENT DOCUMENTS 2,372,196 A * 3/1945 Grime ..................... B66F 13/00
                                                         92/136
3,356,190 A   12/1967 Prussak
(Continued)

FOREIGN PATENT DOCUMENTS

CN        106481695 A      3/2017
DE      112014005547 T5    9/2016
(Continued)

OTHER PUBLICATIONS

International Search Report; priority document.

*Primary Examiner* — Robert A. Siconolfi
*Assistant Examiner* — Mahbubur Rashid
(74) *Attorney, Agent, or Firm* — Greer, Burns & Crain, Ltd.

(57) ABSTRACT

A brake for preventing rotation of a segment of a transmission line used for actuation of control surfaces of an aircraft, including a retaining arm configured for connection to a fixed element of the aircraft, a clamp and a connection member. The clamp includes a first clamp portion having a first engagement surface and a second clamp portion having a second engagement surface facing the first engagement surface. The clamp portions are movable with respect to each other so as to vary a distance between the engagement surfaces. The clamp portions are configured to apply a pressure toward each other with the transmission line segment being received between the engagement surfaces. The connection member interconnects the clamp and the retaining arm, and is selectively configurable between an unlocked configuration allowing relative movement
(Continued)

between the clamp and the retaining arm and a locked configuration preventing the relative movement.

19 Claims, 6 Drawing Sheets

(51) Int. Cl.
    *B64C 13/28*     (2006.01)
    *F16D 121/14*     (2012.01)
    *F16D 125/40*     (2012.01)

(58) Field of Classification Search
    CPC .. F16D 2065/1324; F16D 55/00; F16D 49/16; F16D 2125/40; B60N 2/43; B60N 2/919; B60N 2002/952; B60N 2/2227; B60N 2/146; B64F 5/40; B64C 13/28
    See application file for complete search history.

(56) References Cited

U.S. PATENT DOCUMENTS

| | | | | |
|---|---|---|---|---|
| 3,843,083 A * | 10/1974 | Angibaud | ............... | A45F 5/00 403/90 |
| 4,464,127 A * | 8/1984 | Boudreaux | ............ | B63H 23/32 440/74 |
| 5,743,490 A * | 4/1998 | Gillingham | ........ | B64D 45/0005 244/213 |
| 5,794,897 A * | 8/1998 | Jobin | ..................... | H02G 7/053 248/68.1 |
| 7,048,234 B2 * | 5/2006 | Recksiek | ........... | B64D 45/0005 244/75.1 |
| 8,439,384 B1 * | 5/2013 | Woods | ..................... | A63H 5/00 280/288.4 |
| 8,814,086 B2 * | 8/2014 | Tran | .................. | H01M 8/04014 244/58 |
| 9,682,769 B2 * | 6/2017 | Richter | ................. | B64C 13/341 |
| 2004/0116045 A1 * | 6/2004 | Coleman | .................... | B62J 3/06 446/441 |
| 2007/0246616 A1 * | 10/2007 | Budagher | ............... | F16L 3/237 248/68.1 |
| 2013/0181089 A1 * | 7/2013 | Recksiek | ................. | B64C 9/16 244/99.3 |
| 2014/0291079 A1 * | 10/2014 | Bianchi | ................... | F16D 49/16 188/67 |
| 2016/0312502 A1 | 10/2016 | Miyamoto et al. | | |

FOREIGN PATENT DOCUMENTS

| | | |
|---|---|---|
| FR | 722464 A | 3/1932 |
| LU | 48206 A1 | 5/1965 |

\* cited by examiner

BRAKE FOR TRANSMISSION LINE OF AIRCRAFT CONTROL SURFACES

CROSS-REFERENCES TO RELATED APPLICATIONS

This application claims the benefit of the International Application No. PCT/IB2018/059361, filed on Nov. 27, 2018, and this International PCT Patent Application relies for priority on U.S. Provisional Patent Application Ser. No. 62/592,674 filed on Nov. 30, 2017, the entire contents of both being incorporated herein by reference.

FIELD OF THE INVENTION

This application relates generally to aircraft control surfaces and, more particularly, to transmission lines used to drive the movement of such control surfaces.

BACKGROUND OF THE INVENTION

Aircraft control surfaces such as flaps and slats may be actuated via a transmission line made of multiple segments such as, for example, torque shafts, steady bearings, U-Joints, gearboxes, actuators, etc., connected end to end along the longitudinal axis of the transmission line, and rotating together so as to coordinate the actuation of the control surfaces. When the various segments of the transmission line are installed, they must be clocked, i.e., their relative orientation must be verified and set to ensure that actuation of the control surfaces will be coordinated.

When servicing the flaps or slats systems, or any other components in operational communication with the transmission line, some segments may be required to be removed, for maintenance or replacement. When segments are removed, the rotational alignment of the portions of the transmission line on each side of the removed segment can be lost. Measurements may be taken before and after the segment replacement and compared so as to adjust the rotational alignment as required, or the system may be re-rigged after the segment replacement to correct the rotational amendment. However, such solutions introduce a risk of human error, and may increase the costs, complexity and/or duration of the maintenance operation.

SUMMARY OF THE INVENTION

In one aspect, there is provided a brake for preventing rotation of a segment of a transmission line used for actuation of control surfaces of an aircraft, the brake comprising: a retaining arm configured for connection to a fixed element of the aircraft; a clamp including a first clamp portion having a first engagement surface and a second clamp portion having a second engagement surface facing the first engagement surface, the first and second clamp portions movable with respect to each other so as to vary a distance between the first and second engagement surfaces, the first and second clamp portions configured to apply a pressure toward each other with the segment of the transmission line being received between the first and second engagement surfaces; and a connection member interconnecting the clamp and the retaining arm, the connection member selectively configurable between an unlocked configuration allowing relative movement between the clamp and the retaining arm and a locked configuration preventing the relative movement between the clamp and the retaining arm.

In particular embodiments, the brake may include any one or any suitable combination of the following:

a first cushioning pad defining the first engagement surface and a second cushioning pad defining the second engagement surface;

an adjustment member engaged to the first and second clamp portions and adjustable to vary the distance between the first and second engagement surface, the adjustment member adjustable in a toolless manner;

the adjustment member including a knob threadingly engaged to a rod, the rod having a fixed position with respect to the first clamp portion, the knob movable along a longitudinal direction of the rod upon rotation, the knob configured to provide a force against the second clamp portion toward the first clamp portion upon movement of the knob along the longitudinal direction of the rod;

a self-aligning bearing having an outer ring retained in an opening of the retaining arm and an inner ring pivotable with respect to the outer ring, and a fastener engaged in the inner ring and engageable to the fixed element;

the connection member including a fastener snuggly received in a bore defined through the clamp and loosely received in an opening defined through the retaining arm so as to be movable within the opening, and a nut engaged to the fastener, wherein in the locked configuration a head of the fastener presses against one of the clamp and the retaining arm and the nut pressed against the other of the clamp and the retaining arm so as to press the clamp and retaining arm against each other with a force sufficient to prevent relative movement between the clamp and retaining arm;

the connection member is a first connection member, the brake further comprising a second connection member interconnecting the clamp and the retaining arm, the first and second connection members selectively configurable between the unlocked configuration and the locked configuration.

In a particular embodiment, a kit includes a least first and second brakes each configured as set forth above. The retaining arm of the first brake and the retaining arm of the second brake have different configurations from one another and are configured to engage different fixed elements of the aircraft.

In another aspect, there is provided a wing assembly configured for maintenance, the wing assembly comprising: a transmission line including a plurality of segments interconnected end to end along a longitudinal axis of the transmission line, the plurality of segments rotatable together for actuation of control surfaces of the wing assembly, the plurality of segments including a third segment located between first and second segments, the third segment requiring a maintenance operation to be performed thereon; a first brake including a first clamp engaged to the first segment, the first brake connected to a first bracket having a fixed position within the wing assembly, the first brake preventing rotation of the first segment; and a second brake including a second clamp engaged to the second segment, the second brake connected to a second bracket having a fixed position within the wing assembly, the second brake preventing rotation of the second segment; wherein the first and second brakes are removable from the wing assembly.

In particular embodiments, the wing assembly may include any one or any suitable combination of the following:

the first and second brackets are containment ring brackets each configured to retain a respective containment ring for loosely surrounding the transmission line;

the third segment includes at least one element selected from the group consisting of: actuator, torque shaft, bearing, U-joint, and gearbox;

the first clamp includes a first cushioning pad in contact with the first segment and the second clamp includes a second cushioning pad in contact with the second segment;

each of the first and second clamps includes a respective adjustment member adjustable to vary a first clamping pressure exerted by the first clamp on the first segment and a second clamping pressure exerted by the second clamp on the second segment, the respective adjustment member adjustable in a toolless manner;

the first brake is connected to the first bracket via a self-aligning bearing and the second brake is connected to the second bracket via a second self-aligning bearing;

the first brake includes a first retaining arm connected to the first bracket and the second brake includes a second retaining arm connected to the second bracket, the first clamp having an adjustable position relative to the first retaining arm, the second clamp having an adjustable position relative to the second retaining arm.

In a further aspect, there is provided a method of maintaining rotational alignment between segments of a transmission line during a maintenance operation, the transmission line configured for actuation of control surfaces of an aircraft and including a plurality of segments interconnected end to end along a longitudinal axis of the transmission line, the method comprising: clamping a first one of the segments with a first clamp of a first brake to prevent rotation of the first segment with respect to the first clamp; attaching the first brake to a first bracket having a fixed location within the wing assembly to prevent movement of the first clamp and first segment with respect to the wing assembly; clamping a second one of the segments with a second clamp of a second brake to prevent rotation of the second segment with respect to the second clamp; attaching the second brake to a second bracket having a fixed location within the wing assembly to prevent movement of the second clamp and second segment with respect to the wing assembly; and removing a connection between the first and second segments, the first and second brakes maintaining the rotational alignment between the disconnected first and second segments.

In a particular embodiment, removing a connection between the first and second segments includes removing a third one of the segments located between the first and second segments along the longitudinal axis of the transmission line.

In a particular embodiment, the method further comprises, before attaching the first brake to the first bracket, detaching from the first bracket a containment ring loosely surrounding the transmission line, and attaching the first brake to the first bracket is performed by inserting a fastener through a fastener hole in the first bracket, the fastener hole previously used to retain the containment ring.

In a particular embodiment, attaching the first brake to the first bracket includes attaching a retaining arm of the first brake to the first bracket while the retaining arm is connected to the first clamp via a connection member allowing relative movement between the retaining arm and the first clamp, and locking the connection member to prevent the relative movement between the retaining arm and the first clamp.

In a particular embodiment, clamping the first segment with the first clamp includes rotating a first knob by hand to press two portions of the first clamp toward each other and against the first segment, and clamping the second segment with the second clamp includes rotating a second knob by hand to press two portions of the second clamp toward each other and against the second segment.

BRIEF DESCRIPTION OF THE DRAWINGS

For a better understanding of the present invention, as well as other aspects and further features thereof, reference is made to the following description which is to be used in conjunction with the accompanying drawings, where.

Figure 1:
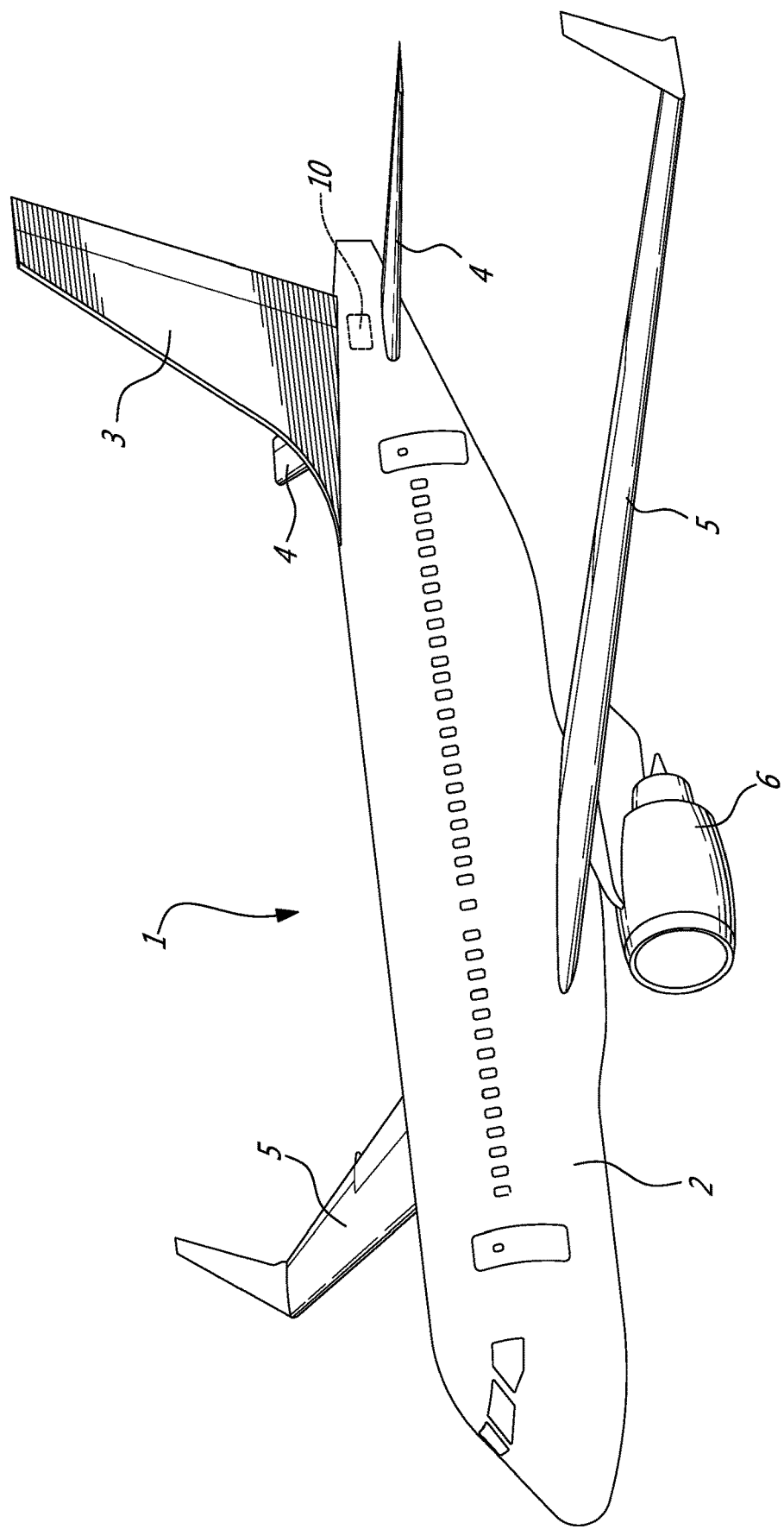
FIG. 1 is a schematic tridimensional view of an aircraft.

In the drawings, embodiments of the invention are illustrated by way of example. It is to be expressly understood that the description and drawings are only for purposes of illustration and as an aid to understanding. They are not intended to be a definition of the limits of the invention.

DETAILED DESCRIPTION OF THE PREFERRED EMBODIMENTS

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft. It is also understood that although FIG. 1 shows a commercial aircraft, the aircraft 1 may alternately be any other type of aircraft, including, but not limited to, a business aircraft or a private aircraft.

Figure 2:
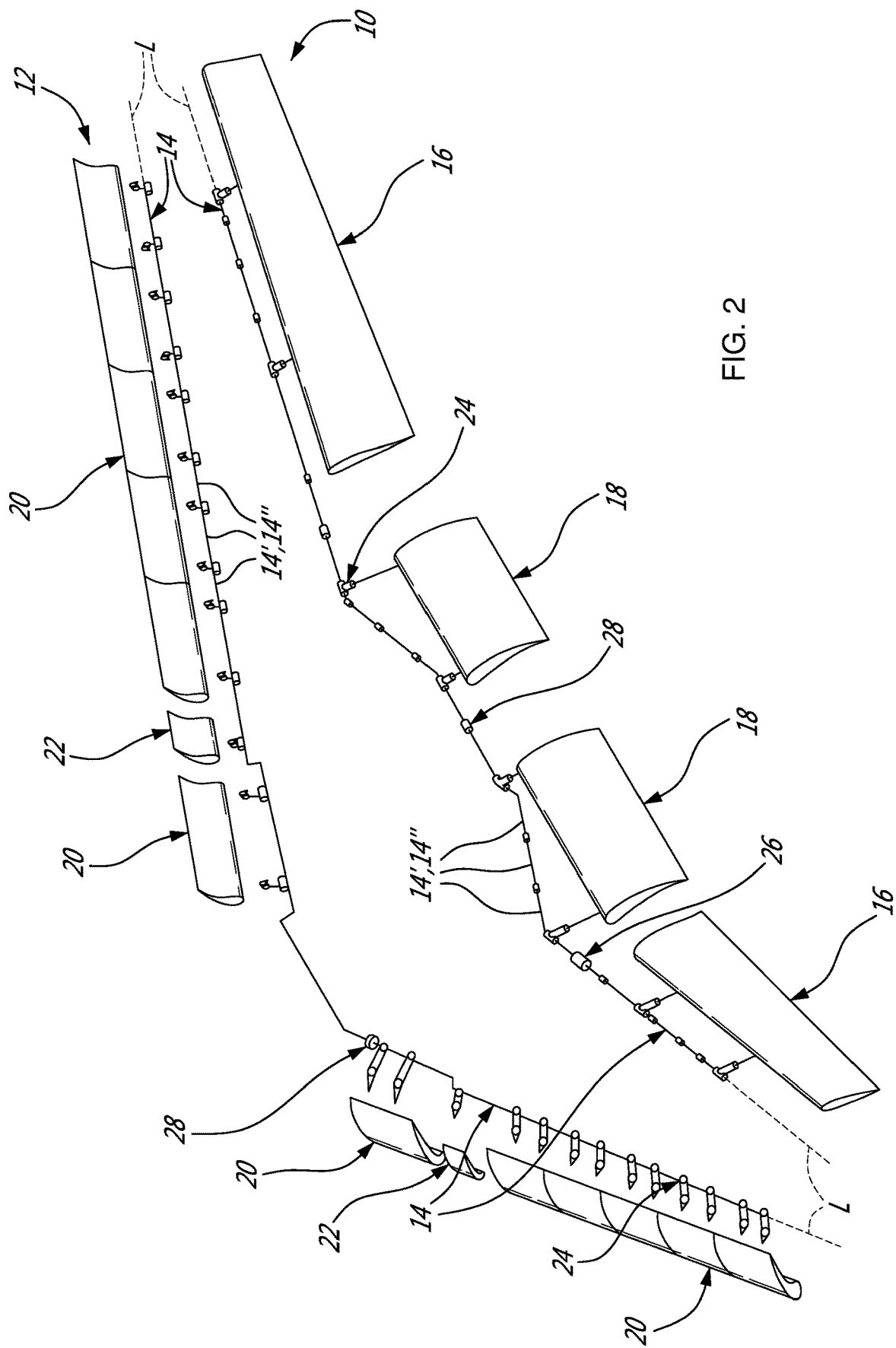
FIG. 2 is a schematic tridimensional view of control surfaces of a wing of an aircraft such as shown in FIG. 1, which are actuated via a corresponding transmission line.

Referring to FIG. 2, an example of a configuration for wing control surfaces for the wing 5 and transmission line 14 is shown. The wing control surfaces include a trailing edge wing assembly 10 and a leading edge wing assembly 12, with each wing assembly 10, 12 including a transmission line 14 for transmitting actuation to the various control surfaces of the assembly. In the embodiment shown, the trailing edge wing assembly 10 includes an outboard flap 16 and an inboard flap 18 for each wing 5, and the leading edge wing assembly 12 includes a plurality of slats 20 and a Kruger flap 22 for each wing 5. It is understood that the configurations shown are exemplary only and that any other suitable configurations may alternately be used.

Each transmission line 14 includes a plurality of segments 14', 14" interconnected end to end along a longitudinal axis L of the transmission line 14. The segments 14', 14" are rotatable together for actuation of the control surfaces 16, 18, 20, 22 of the assembly. The segments 14', 14" each include a shaft portion, and may also include or be connected to other components such as actuators 24, trim units 26, etc. Each transmission line 14 is also connected to a suitable system driving its rotation, for example a power distribution unit 28 receiving commands from an engine controller (not shown).

Figure 3:
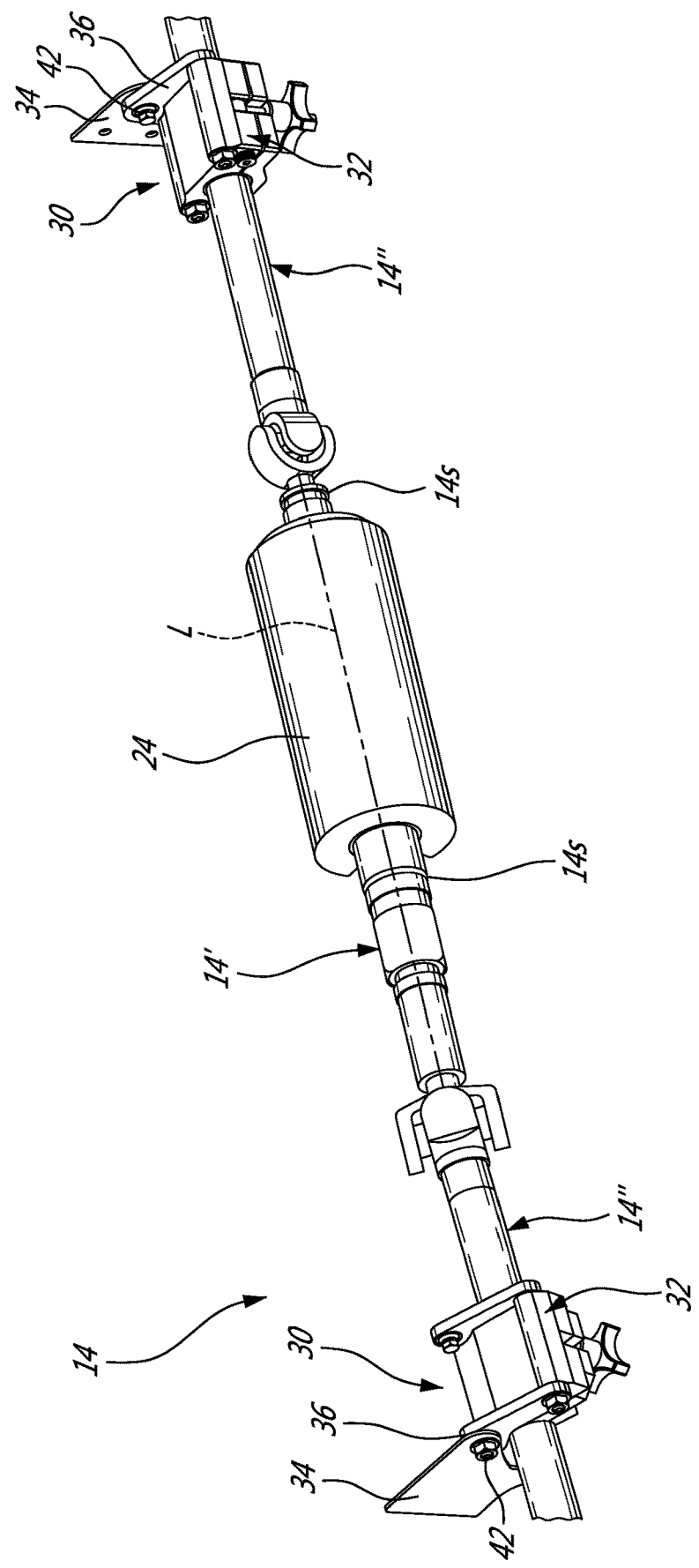
FIG. 3 is a schematic tridimensional view of part of one transmission line of FIG. 2, where two segments of the transmission line are each engaged to a brake in accordance with a particular embodiment.

Referring to FIG. 3, three segments of one of the transmission line 14 of FIG. 2 are schematically shown: a segment 14' requiring to be removed for replacement or maintenance (herein after, "removed segment"), and two other segments 14" respectively located inboard and outboard of the removed segment 14' (herein after, "remaining segment"). In the embodiment shown, the two remaining segments 14" each correspond to a torque shaft, and the removed segment 14' includes a shaft portion 14s for engagement with the remaining segments 14" and an additional component, such as, for example, an actuator 24; alternately, the removed segment 14' can include one or more elements selected from: actuator(s), torque shaft(s), bearing(s), U-joint(s), gearbox(es), etc. It is understood that the embodiment shown is exemplary, and that the removed segment 14' and the remaining segments 14" may be any suitable portion of the transmission line 14.

In order to minimize the duration and complexity of the maintenance operation, it is desirable to maintain the relative orientation between the remaining segments 14" upon removal of the removed segment 14', i.e., during the period where the remaining segments 14" are no longer interconnected by the removed segment 14'. Accordingly, the orientation of each of the remaining segments 14" is maintained through engagement with a respective brake 30, which is engaged to the respective remaining segment 14" before removal of the removed segment 14'.

Each brake 30 generally includes a clamp 32 engaged to the respective remaining segment 14", and is connected to a fixed element of the aircraft, i.e., to an element of the aircraft which is retained in a fixed position relative to adjacent structural components of the aircraft. In the embodiment shown, the fixed element is a bracket 34. The brake 30 thus prevents rotation of the respective remaining segment 14". By preventing rotation of the disconnected remaining segments 14", the brakes 30 maintain the orientation of the remaining segments 14" relative to each other and accordingly the clocking of the transmission line 14 is maintained during the replacement/maintenance operation.

Figure 4:
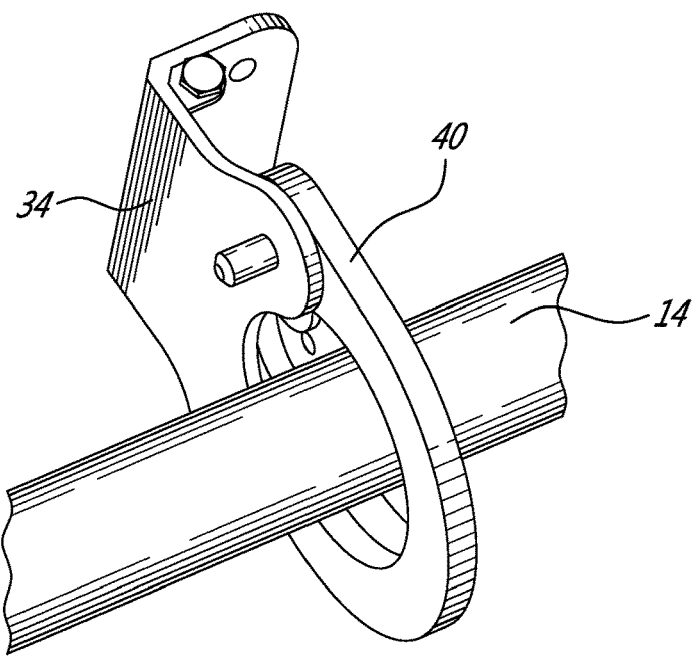
FIG. 4 is a schematic tridimensional view of a containment ring surrounding the transmission line and associated bracket in accordance with a particular embodiment.
Figure 5:
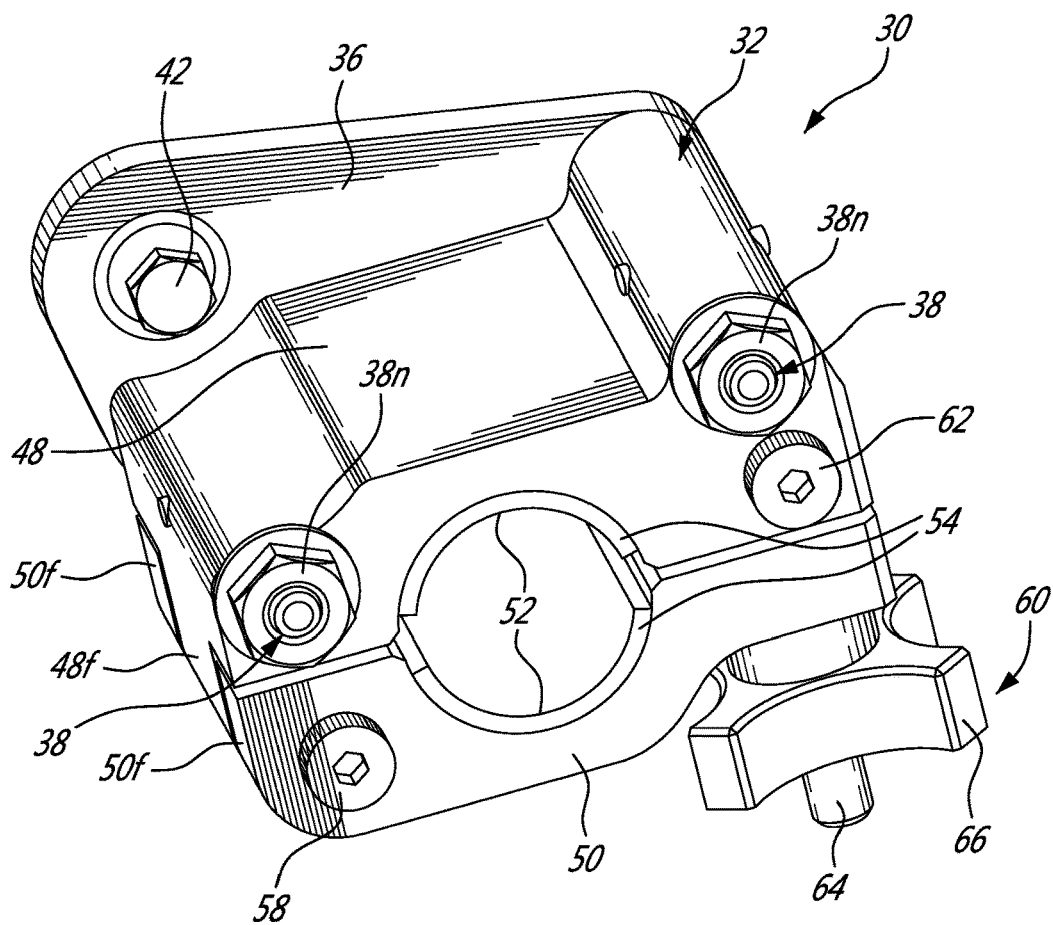
FIG. 5 is a schematic tridimensional view of one of the brakes of FIG. 3.
Figure 6:
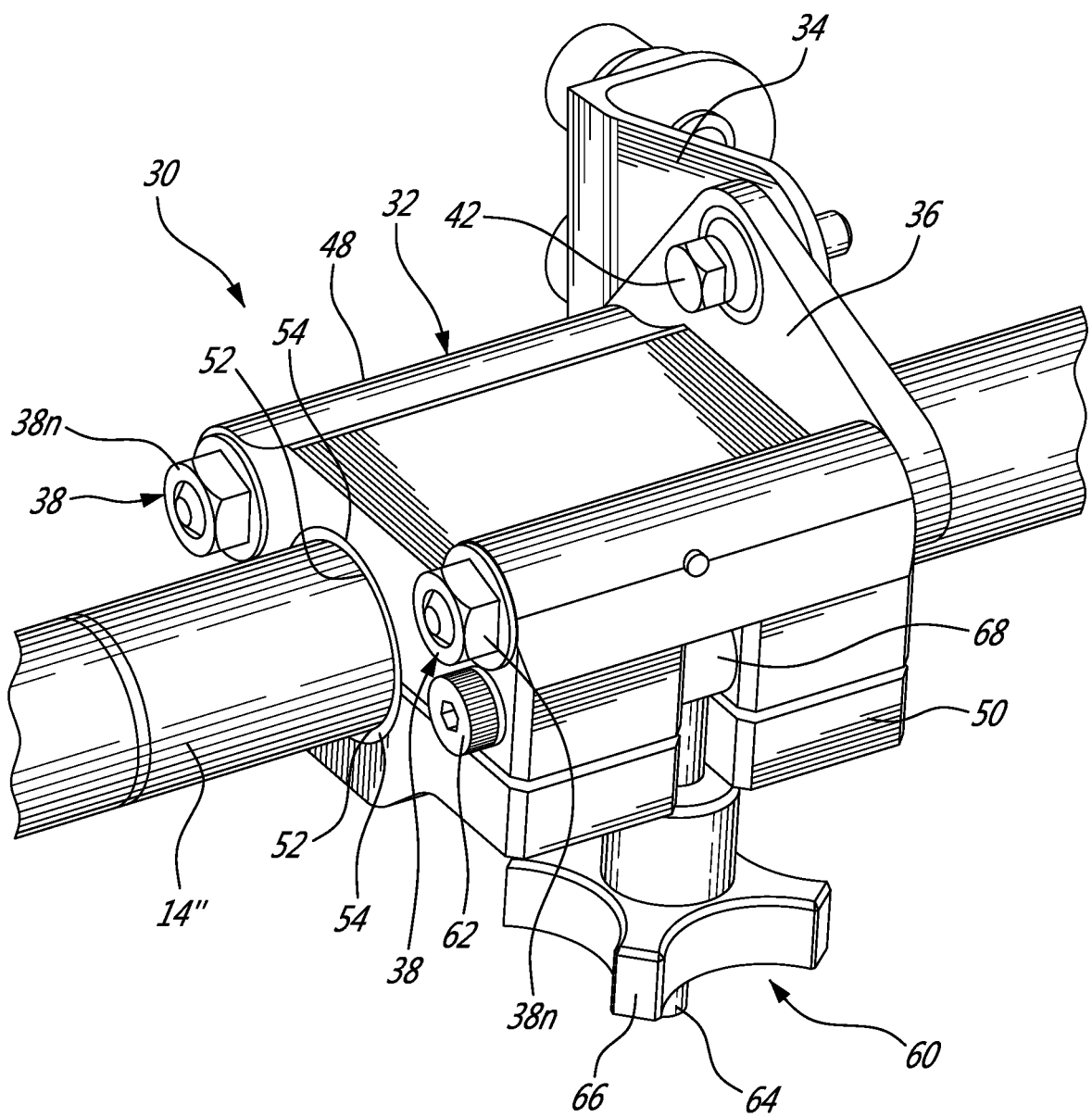
FIG. 6 is a schematic tridimensional view of the brake of FIG. 5 engaged to the bracket of FIG. 4, after removal of the containment ring.
Figure 7:
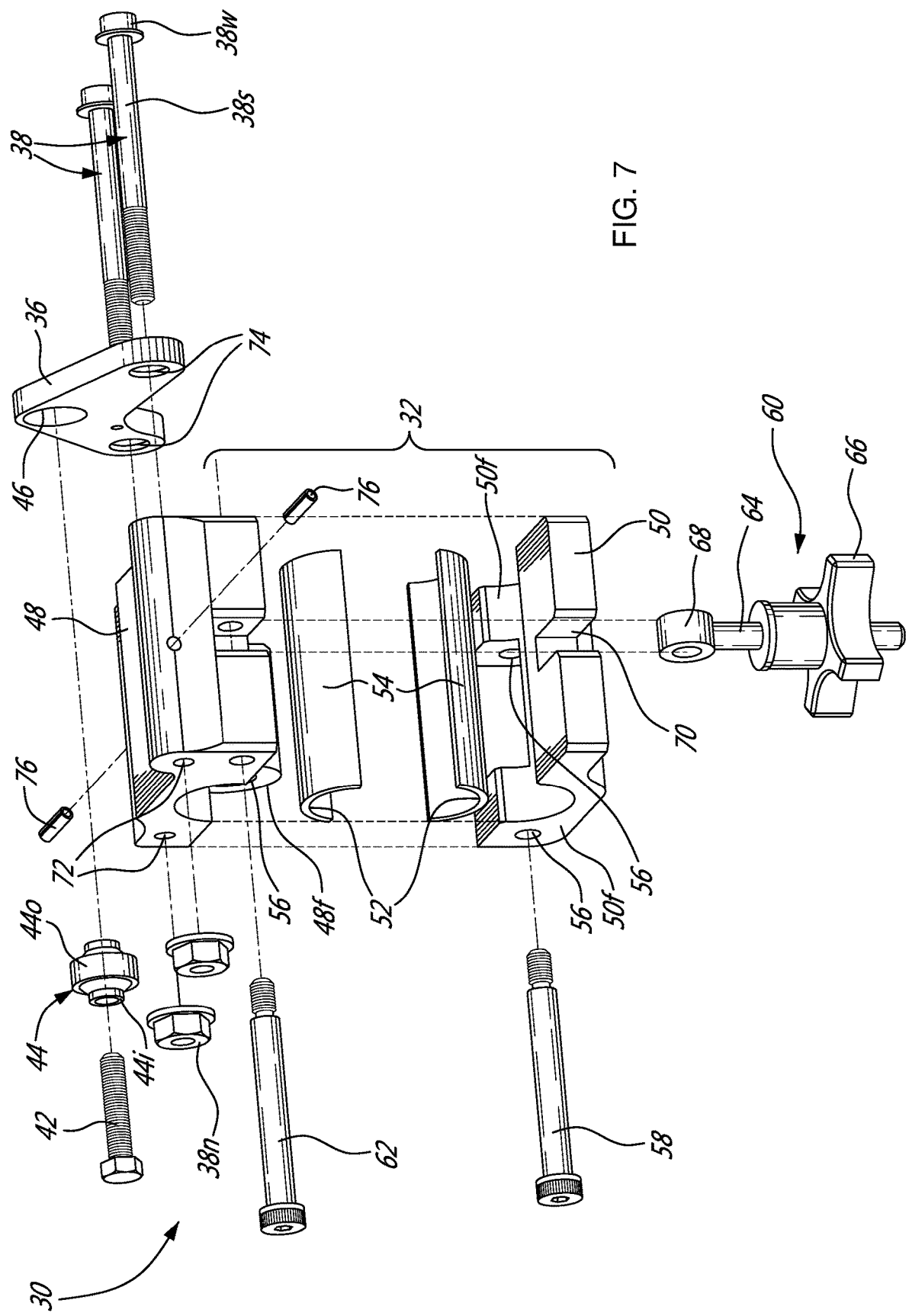
FIG. 7 is a schematic, exploded tridimensional view of the brake of FIG. 5.

Referring to FIGS. 5-7, the brake 30 in accordance with a particular embodiment is shown. The brake 30 generally includes a retaining arm 36 and the clamp 32, which are interconnected by one or more connection member(s) 38. The retaining arm 36 is configured for connection to the fixed element of the aircraft, e.g., bracket 34 (FIG. 5). In a particular embodiment and referring to FIG. 4, the wing assembly includes a plurality of brackets 34 (only one being shown in FIG. 4) each supporting a respective containment ring 40, which is, for example, made of plastic and which loosely surrounds a respective one of the segments 14', 14" so as to limit movement of the transmission line 14 upon accidental separation between transmission line segments or upon segment failure during use. The brackets 34 are attached to a structural component of the wing, for example to a rib. Referring back to FIGS. 3 and 6, in the embodiment shown the bracket 34 to which the retaining arm 36 is engaged is the same bracket which supports one of the containment rings 40. The containment ring 40 surrounding the remaining segment 14" is removed before the brake 30 is attached to the bracket 34, and fastener hole(s) in the bracket 34 which were used to receive fastener(s) engaging the containment ring 40 are used to receive fastener(s) 42 engaging the retaining arm 36 to the bracket 34. Accordingly, the brake 30 may be engaged to the aircraft structure without the need to provide additional features on the aircraft structure to form the engagement. It is however understood that alternately, the retaining arm 36 may be connected to any other suitable fixed element of the aircraft.

Referring to FIG. 6, in the embodiment shown, the retaining arm 36 is attached to the bracket 34 via a single fastener 42. Referring to FIG. 7, the brake 30 includes a self-aligning bearing 44 having an outer ring 44o retained in an opening 46 defined through the retaining arm 36, and an inner ring 44i pivotable with respect to the outer ring 44o. The fastener 42 engaged to the bracket 34 is received and retained in the inner ring 44i. In a particular embodiment, the self-aligning bearing 44 allows for the orientation of the retaining arm 36 relative to the bracket 34 to be adjusted, for example allowing the retaining arm 36 to be retained in contact with and in alignment with the bracket 34 even if the fastener opening defined through the bracket 34 is not perfectly normal to the surface of the bracket 34 in contact with the retaining arm 36. It is understood that alternately, the self-aligning bearing 44 may be replaced any other suitable element providing a suitable compensation for an expected misalignment.

Referring back to FIGS. 5-7, the clamp 32 includes two clamp portions, which are referred to herein as "upper clamp portion" 48 and "lower clamp portion" 50; it is however understood that the clamp 32 may have any other orientation in use, and the terms "upper" and "lower" are used herein in a non-limiting manner only to facilitate reference to the Figures. The upper and lower clamp portions 48, 50 each have an engagement surface 52 configured for engaging the transmission line segment 14" (e.g., torque shaft). The engagement surfaces 52 of the clamp portions 48, 50 face each other. The clamp portions 48, 50 are movable with respect to each other so as to vary a distance between the engagement surfaces 52, and accordingly vary a pressure that the engagement surfaces 52 apply on the transmission line segment 14" received therebetween. In the embodiment shown, the engagement surface 52 are arcuate with a radius similar to that of the transmission line segment 14", so as to maximize contact between the engagement surfaces 52 and the transmission line segment 14"; any other suitable configuration may alternately be used.

In the embodiment shown, the engagement surfaces 52 in contact with the transmission line segment 14" are defined by cushioning pads 54 received and retained against a surface of the respective clamp portion 48, 50. The cushioning pads 54 may reduce the risk of damage to the transmission line segment 14" upon engagement with the clamp 32, including, but not limited to, in embodiments where the transmission line segment 14" is a torque shaft made of composite material. In a particular embodiment, the cushioning pads 54 are made of rubber. Any other suitable material may alternately be used.

In the embodiment shown, the clamp portions 48, 50 are interconnected along one side by a hinge connection, about which they can be pivoted away from each other so as to be able to engage the clamp 32 to the transmission line segment 14". As can be best seen in FIGS. 5 and 7, the upper clamp portion 48 has one finger 48f protruding therefrom and the lower clamp portion 50 has two fingers 50f protruding therefrom, spaced apart a distance sufficient so that the finger 48f of the upper clamp portion 48 can be received between the fingers 50f of the lower clamp portion 50. The fingers 48f, 50f have aligned bores 56 (FIG. 7) defined therethrough, and a suitable fastener 58, for example a shoulder bolt, is received through the aligned bores 56 to define the pivot connection of the hinge. It is understood that any other suitable type of connection, including, but not limited to, any other suitable hinge configuration, may alternately be used.

Referring back to FIGS. 5-7, the brake 30 includes an adjustment member 60 engaged to the clamp portions 48, 50 and adjustable to vary the distance between the engagement surfaces 52, so as to vary the pressure applied by the engagement surfaces 52 toward each other and upon the transmission line segment 14". In the embodiment shown, the adjustment member 60 is adjustable in a toolless manner, i.e., adjustable manually without the need for a tool. The manual adjustment may reduce the risk of damage to the transmission line segment 14" upon engagement with the clamp 32, including, but not limited to, in embodiments where the transmission line segment 14" is a torque shaft made of composite material, by limiting the pressure that can effectively be applied on the transmission line segment 14".

In the embodiment shown and as can be best seen in FIG. 7, the adjustment member 60 includes a shoulder bolt 62, a threaded rod 64, and a knob 66. The shoulder bolt 62 is connected to the upper clamp portion 48, and the threaded rod 64 extends transversely to the shoulder bolt 62 and is connected thereto, for example by being connected to a ring 68 through which the shoulder bolt 62 extends. The threaded rod 64 accordingly has a fixed position with respect to the upper clamp portion 48. The threaded rod 64 extends from the upper clamp portion 48 and is received in a slot 70 defined through the lower clamp portion 50. The knob 66 is threadingly engaged to the threaded rod 64 so as to be movable along a longitudinal direction of the threaded rod 64 upon rotation. The lower clamp portion 50 is located between the knob 66 and the upper clamp portion 48, and the knob 66 is sized so as to be larger than the slot 70 of the lower clamp portion 50 receiving the threaded rod 64, so that the knob 66 is abuttable against the lower surface of the lower clamp portion 50. Accordingly, the knob 66 provides a force against the lower clamp portion 50 toward the upper clamp portion 48 upon rotation of the knob 66 in a direction causing the knob 66 to move along the threaded rod 64 toward the upper clamp portion 48. By rotating the knob 66, the user can thus increase or decrease the clamping pressure produced by the clamp 32.

As can also be best seen in FIG. 7, one or more connection member(s) 38 interconnect(s) the clamp 32 and the retaining arm 36. In the embodiment shown, two connection members 38 are provided, each defined by a suitable fastener (e.g., cap screw 38s with washer 38w) engaged to a nut 38n. Each connection member 38 is selectively configurable between an unlocked configuration allowing relative movement between the clamp 32 and the retaining arm 36 and a locked configuration preventing the relative movement between the clamp 32 and the retaining arm 36. In a particular embodiment, this helps ensure that the connection of the brake 30 with the bracket 34 does not apply an undesirable bending moment to the remaining segment 14", so as to reduce the risk of damage and/or displacement of the remaining segments 14" retained by the brakes 30.

In the embodiment shown, each screw 38s is snuggly received in a corresponding unthreaded bore 72 defined through the upper clamp portion 50, i.e., the screw 38s and bore 72 are relatively sized so that movement of the screw 38s within the bore 72 along their radial direction is negligible or prevented. A dowel 76 is received in a corresponding opening defined through the upper clamp portion 50 transversely to and in communication with the bore 72; the dowel 76 engages a groove (not shown) of the screw 38s and prevents axial movement of the screw 38s within the bore 72 while allowing the screw 38s to rotate about its longitudinal axis. The screw 38s is also loosely received in an opening 74 defined through the retaining arm 36, i.e., the screw 38s and opening 74 and relatively sized so that movement of the screw 38s within the opening along their radial direction is possible. The washer 38w is provided around the screw 38s adjacent its head, and is located adjacent a surface of the retaining arm 36 opposite the clamp 32. The nut 38n engages the threaded end of the screw 38s which protrudes from the bore 72 of the clamp 32 opposite the retaining arm 36.

In the unlocked configuration, no torque is applied on the screw 38s and nut 38n assembly, and the possible movement of the screw 38s within the opening 74 of the retaining arm 36 allows for adjustment in the position of the clamp 32 with respect to the retaining arm 36. In the locked configuration, a predetermined torque is applied to the screw 38s and nut 38n assembly; the head of the fastener 38s presses against the retaining arm 36 toward the clamp 32 via the washer 38w, and the nut 38n presses against the clamp 32 toward the retaining arm 36, so that the clamp 32 and the retaining arm 36 are pressed against each other with a force sufficient to prevent the relative movement between the clamp 32 and retaining arm 36.

It is understood that any other suitable configuration for the connection member 38 may alternately be used. For example, the position of the screw head and nut could be inverted, and any other suitable type of fastener may alternately be used.

The brakes 30 accordingly prevent accidental rotation of the disconnected remaining segments 14" of the transmission line 14 during maintenance, using a clamping force which is sufficient to prevent the remaining segments 14" from rotating without damaging the segments 14". In a particular embodiment, by ensuring that the remaining segments 14" do not lose their clocking with the serviced component, the brakes 30 allow for the return of the aircraft into service more quickly, eliminating, for example, the need for a re-synchronization of the transmission line clocking after the replacement of the removed segment 14'.

In the embodiment shown, the brakes 30 are removable from the wing assembly, i.e., they are not part of the wing assembly during use of the aircraft. The clamping force is not sufficient to prevent the remaining segments 14" from rotating if the system is actuated (e.g., if the transmission line 14 is actuated to rotate by the power distribution unit 28), and accordingly the brakes 30 are not designed to brake the transmission line segments 14" during normal use. The brakes 30 can be provided as a kit, for example including multiple brakes 30 having retaining arms 36 with different configurations from each other, with each retaining arm 36 tailored to engage a specific bracket 34 or other existing fixed element adjacent the transmission line 14, depending on which segment(s) 14' need to be removed and which segments 14" need to be engaged by brakes 30.

In a particular embodiment, the orientation adjustment between the retaining arm 36 and bracket 34 provided by the self-aligning bearing 44 and/or the position adjustment between the clamp 32 and retaining arm 36 provided by the connection member(s) 38 allow to accommodate variations between aircraft, for example due to acceptable tolerances.

In use and in accordance with a particular embodiment, maintaining the alignment between the segments of the transmission line 14 thus includes clamping a first segment 14" with the clamp 32 of a first brake 30 to prevent rotation of the first segment 14" with respect to the clamp 32, and attaching the first brake 30 to a first bracket 34 having a fixed location within the wing assembly to prevent movement of the clamp 32 and first segment 14" with respect to the wing assembly. Similarly, a second segment 14" is clamped with the clamp 32 of a second brake 30 to prevent rotation of the second segment 14" with respect to the second clamp 32, and the second brake 30 is attached to a second bracket 34 having a fixed location within the wing assembly to prevent movement of the second clamp 32 and second segment 14" with respect to the wing assembly. The connection between the first and second segments 14" can then be removed, and the brakes 30 maintain the rotational alignment between the disconnected segments 14". In a particular embodiment, removing the connection between the first and second segments 14" includes removing a third segment 14' located between the first and second segments 14" along the longitudinal axis L of the transmission line 14.

In a particular embodiment, attaching the brake 30 to the bracket 34 includes detaching from the bracket 34 the containment ring 40 (FIG. 4) loosely surrounding the transmission line segment 14". With the connection member(s) 38 unlocked, i.e., while the retaining arm 36 is movable with respect to the clamp 32, the brake 30 is then positioned with the retaining arm 36 adjacent the bracket 34 and the clamp 32 is clamped onto the remaining segment 14" by applying a manual torque sufficient to prevent relative movement between the clamp 32 and segment 14". In the embodiment shown, this is performed by rotating the knob 66 by hand to press the two portions 48, 50 of the clamp 32 toward each other and against the remaining segment 14". Once the clamp 32 is engaged, the retaining arm 36 is then attached to the bracket 34 by inserting a fastener 42 through the fastener hole of the bracket 34 which was previously used to retain the containment ring 40. The fastener 42 is torqued in place using a suitable tool so as to fix the relative positions of the retaining arm 36 and bracket 34. The connection member(s) 38 interconnecting the retaining arm 36 and the clamp 32 are then locked to prevent the relative movement between the retaining arm 36 and the clamp 32, for example by applying torque to the connection member(s) 38 with a suitable tool.

Once these operations are performed for the brake 30 engaging the remaining segment 14" outboard of the segment 14' to be removed and for the brake 30 engaging the remaining segment 14" inboard of the segment 14' to be removed, the replacement/maintenance operation may be performed. After the replacement/maintenance operation is done and the segments 14', 14" of the transmission line 14 are re-connected to each other, the brakes 30 are disengaged from the segments 14", removed from the assembly, and stored in a suitable manner.

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A brake for preventing rotation of a segment of a transmission line used for actuation of flight control surfaces of an aircraft during a maintenance operation, the brake comprising:

a retaining arm configured for connection to a fixed element of the aircraft;

a clamp including a first clamp portion having a first engagement surface and a second clamp portion having a second engagement surface facing the first engagement surface, the first and second clamp portions manually movable with respect to each other so as to vary a distance between the first and second engagement surfaces, the first and second clamp portions configured to apply a clamping pressure toward each other with the segment of the transmission line being received between the first and second engagement surfaces as the first and second clamp portions are manually moved towards each other, the clamping pressure being sufficient to prevent rotation of the segment of the transmission line received between the first and second engagement surfaces, and insufficient to cause damage to the segment of the transmission line; and a connection member interconnecting the clamp and the retaining arm, the connection member selectively configurable between an unlocked configuration allowing relative movement between the clamp and the retaining arm and a locked configuration preventing the relative movement between the clamp and the retaining arm, wherein the connection member includes a fastener snugly received in a bore defined through the clamp and loosely received in an opening defined through the retaining arm so as to be movable within the opening, and a nut engaged to the fastener, and wherein in the locked configuration a head of the fastener presses against one of the clamp and the retaining arm and the nut pressed against the other of the clamp and the retaining arm so as to press the clamp and retaining arm against each other with a force sufficient to prevent relative movement between the clamp and retaining arm.

2. The brake as defined in claim 1, further comprising a first cushioning pad defining the first engagement surface and a second cushioning pad defining the second engagement surface.

3. The brake as defined in claim 1, further comprising an adjustment member engaged to the first and second clamp portions and adjustable to vary the distance between the first and second engagement surface, the adjustment member being manually adjustable in a toolless manner.

4. The brake as defined in claim 3, wherein the adjustment member includes a knob threadingly engaged to a rod, the rod having a fixed position with respect to the first clamp portion, the knob movable along a longitudinal direction of the rod upon rotation, the knob configured to provide a force against the second clamp portion toward the first clamp portion upon movement of the knob along the longitudinal direction of the rod.

5. The brake as defined in claim 1, further comprising a self-aligning bearing having an outer ring retained in an opening of the retaining arm and an inner ring pivotable with respect to the outer ring, and a fastener engaged in the inner ring and engageable to the fixed element.

6. The brake as defined in claim 1, wherein the connection member is a first connection member, the brake further comprising a second connection member interconnecting the clamp and the retaining arm, the first and second connection members selectively configurable between the unlocked configuration and the locked configuration.

7. A kit including a at least first and second brakes, each brake being for preventing rotation of a segment of a transmission line used for actuation of flight control surfaces of an aircraft during a maintenance operation, the first and second brake each comprising:
a retaining arm configured for connection to a fixed element of the aircraft;
a clamp including a first clamp portion having a first engagement surface and a second clamp portion having a second engagement surface facing the first engagement surface, the first and second clamp portions manually movable with respect to each other so as to vary a distance between the first and second engagement surfaces, the first and second clamp portions configured to apply a clamping pressure toward each other with the segment of the transmission line being received between the first and second engagement surfaces as the first and second clamp portions are manually moved towards each other, the clamping pressure being sufficient to prevent rotation of the segment of the transmission line received between the first and second engagement surfaces, and insufficient to cause damage to the segment of the transmission line; and
a connection member interconnecting the clamp and the retaining arm, the connection member selectively configurable between an unlocked configuration allowing relative movement between the clamp and the retaining arm and a locked configuration preventing the relative movement between the clamp and the retaining arm,
wherein the retaining arm of the first brake and the retaining arm of the second brake have different configurations from one another and are configured to engage different fixed elements of the aircraft.

8. A wing assembly configured for maintenance, the wing assembly comprising:
a transmission line including a plurality of segments interconnected end to end along a longitudinal axis of the transmission line, the plurality of segments rotatable together for actuation of control surfaces of the wing assembly, the plurality of segments including a third segment located between first and second segments, the third segment requiring a maintenance operation to be performed thereon;
a first brake including a first clamp engaged to the first segment, the first brake connected to a first bracket having a fixed position within the wing assembly, the first brake preventing rotation of the first segment; and
a second brake including a second clamp engaged to the second segment, the second brake connected to a second bracket having a fixed position within the wing assembly, the second brake preventing rotation of the second segment;
wherein the first and second brakes are removable from the wing assembly.

9. The wing assembly as defined in claim 8, wherein the first and second brackets are containment ring brackets each configure to retain a respective containment ring for loosely surrounding the transmission line.

10. The wing assembly as defined in claim 8, wherein the third segment includes at least one element selected from a group consisting of: actuator, torque shaft, bearing, U-joint, and gearbox.

11. The wing assembly as defined in claim 8, wherein the first clamp includes a first cushioning pad in contact with the first segment and the second clamp includes a second cushioning pad in contact with the second segment.

12. The wing assembly as defined in claim 8, wherein each of the first and second clamps includes a respective adjustment member adjustable to vary a first clamping pressure exerted by the first clamp on the first segment and a second clamping pressure exerted by the second clamp on the second segment, the respective adjustment member adjustable in a toolless manner.

13. The wing assembly as defined in claim 8, wherein the first brake is connected to the first bracket via a self-aligning bearing and the second brake is connected to the second bracket via a second self-aligning bearing.

14. The wing assembly as defined in claim 8, wherein the first brake includes a first retaining arm connected to the first bracket and the second brake includes a second retaining arm connected to the second bracket, the first clamp having an adjustable position relative to the first retaining arm, the second clamp having an adjustable position relative to the second retaining arm.

15. A method of maintaining rotational alignment between segments of a transmission line during a maintenance operation, the transmission line configured for actuation of control surfaces of an aircraft and including a plurality of segments interconnected end to end along a longitudinal axis of the transmission line, the method comprising:
clamping a first one of the segments with a first clamp of a first brake to prevent rotation of the first segment with respect to the first clamp;
attaching the first brake to a first bracket having a fixed location within a wing assembly to prevent movement of the first clamp and first segment with respect to the wing assembly;
clamping a second one of the segments with a second clamp of a second brake to prevent rotation of the second segment with respect to the second clamp;
attaching the second brake to a second bracket having a fixed location within the wing assembly to prevent movement of the second clamp and second segment with respect to the wing assembly; and removing a connection between the first and second segments, the first and second brakes maintaining the rotational alignment between the disconnected first and second segments.

16. The method as defined in claim 15, wherein removing a connection between the first and second segments includes removing a third one of the segments located between the first and second segments along the longitudinal axis of the transmission line.

17. The method as defined in claim 15, further comprising, before attaching the first brake to the first bracket, detaching from the first bracket a containment ring loosely surrounding the transmission line, and attaching the first brake to the first bracket is performed by inserting a fastener through a fastener hole in the first bracket, the fastener hole previously used to retain the containment ring.

18. The method as defined in claim 15, wherein attaching the first brake to the first bracket includes attaching a retaining arm of the first brake to the first bracket while the retaining arm is connected to the first clamp via a connection member allowing relative movement between the retaining arm and the first clamp, and locking the connection member to prevent the relative movement between the retaining arm and the first clamp.

19. The method as defined in claim 15, wherein clamping the first segment with the first clamp includes rotating a first knob by hand to press two portions of the first clamp toward each other and against the first segment, and clamping the second segment with the second clamp includes rotating a second knob by hand to press two portions of the second clamp toward each other and against the second segment.

* * * * *